United States Patent [19]

Fournier

[11] Patent Number: 4,942,667
[45] Date of Patent: Jul. 24, 1990

[54] PORTABLE AXLE AND FRAME ALIGNMENT TOOL

[75] Inventor: Jerald C. Fournier, Columbia City, Ind.

[73] Assignee: Axle-Tru, Inc., Columbia City, Ind.

[21] Appl. No.: 370,054

[22] Filed: Jun. 12, 1989

Related U.S. Application Data

[63] Continuation of Ser. No. 121,853, Nov. 17, 1987, abandoned.

[51] Int. Cl.⁵ .............................................. G01B 11/27
[52] U.S. Cl. ...................................... 33/288; 33/228; 33/608
[58] Field of Search ............ 33/288, 228, 608, 203.15, 33/203.16, 203.17, 203.18, 203.19, 203.20, 203.21; 356/154, 155

[56] References Cited

U.S. PATENT DOCUMENTS

| | | | |
|---|---|---|---|
| 2,573,056 | 10/1951 | Polinske | 33/288 |
| 2,590,722 | 3/1952 | Otis . | |
| 2,689,403 | 9/1954 | Wilkerson . | |
| 3,079,695 | 3/1963 | Mineck . | |
| 3,137,076 | 6/1964 | Hurst . | |
| 3,162,950 | 12/1964 | Hykes . | |
| 3,182,405 | 5/1965 | Taylor . | |
| 3,325,905 | 6/1967 | Hurst . | |
| 3,337,961 | 8/1967 | Holub . | |
| 3,398,453 | 8/1968 | Hurst . | |
| 3,417,479 | 12/1968 | Hirmann . | |
| 3,550,277 | 12/1970 | Selnes . | |
| 3,566,476 | 3/1971 | McWhorter . | |
| 3,810,313 | 5/1974 | Hicks | 33/288 |
| 3,962,796 | 6/1976 | Johnston | 33/288 |
| 4,006,532 | 2/1977 | Hallman | 33/288 |
| 4,015,338 | 4/1977 | Kunze et al. | 33/228 |
| 4,058,903 | 11/1977 | Wilkerson | 33/288 |
| 4,159,574 | 7/1979 | Samuelsson et al. | 33/228 |
| 4,337,581 | 7/1982 | Eck | 33/288 |
| 4,413,420 | 11/1983 | Hoffman et al. | 33/203.17 |
| 4,416,065 | 11/1983 | Hunter | 33/203.15 |
| 4,441,259 | 4/1984 | Leitermann et al. | 33/288 |
| 4,442,608 | 4/1984 | Clausen | 33/288 |
| 4,510,694 | 4/1985 | Boyce | 33/203.18 |
| 4,513,508 | 4/1985 | Jarman et al. | 33/288 |
| 4,569,140 | 2/1986 | Hobson | 33/203.18 |
| 4,577,413 | 3/1986 | Mason | 33/203.18 |
| 4,615,618 | 10/1986 | Bailey et al. | 33/288 |
| 4,630,379 | 12/1986 | Wickmann et al. | 33/288 |
| 4,690,557 | 9/1987 | Wiklund | 356/155 |

Primary Examiner—Allan N. Shoap
Assistant Examiner—Patrick R. Scanlon
Attorney, Agent, or Firm—Barnes & Thornburg

[57] ABSTRACT

A portable apparatus for aligning the axles of a tractor, a trailer, or other vehicle and for detecting bends, bows, twists and other irregularities in vehicle frames, has a light source used to provide a reference plane from which measurements can be taken. Dual targets are attached to the underside of the vehicle frame and are used in conjunction with the light source to establish the reference plane. In certain embodiments, the light source is slidably arranged on a U-shaped frame and is positionable to project a light beam at the targets. Once a reference plane is established, a gauge can be used to measure irregularities in the vehicle frame by measuring the distance from the reference plane to the underside of the vehicle frame. The U-shaped frame is directly attached along the center axis of the wheel axle so that the horizontal bar on which a light support is arranged will be exactly parallel to the wheel axle and thus provide a more accurate measurement of misalignment. Certain preferred embodiments include a perpendicularity checking device which assures that the beam of light is perpendicular to the horizontal bar, so that accurate and reliable measurements can be obtained.

17 Claims, 4 Drawing Sheets

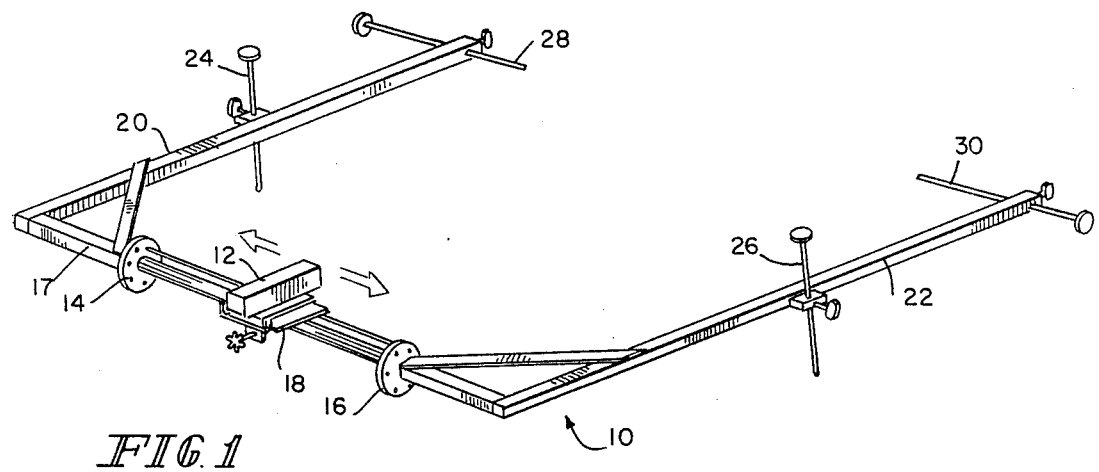
FIG. 1
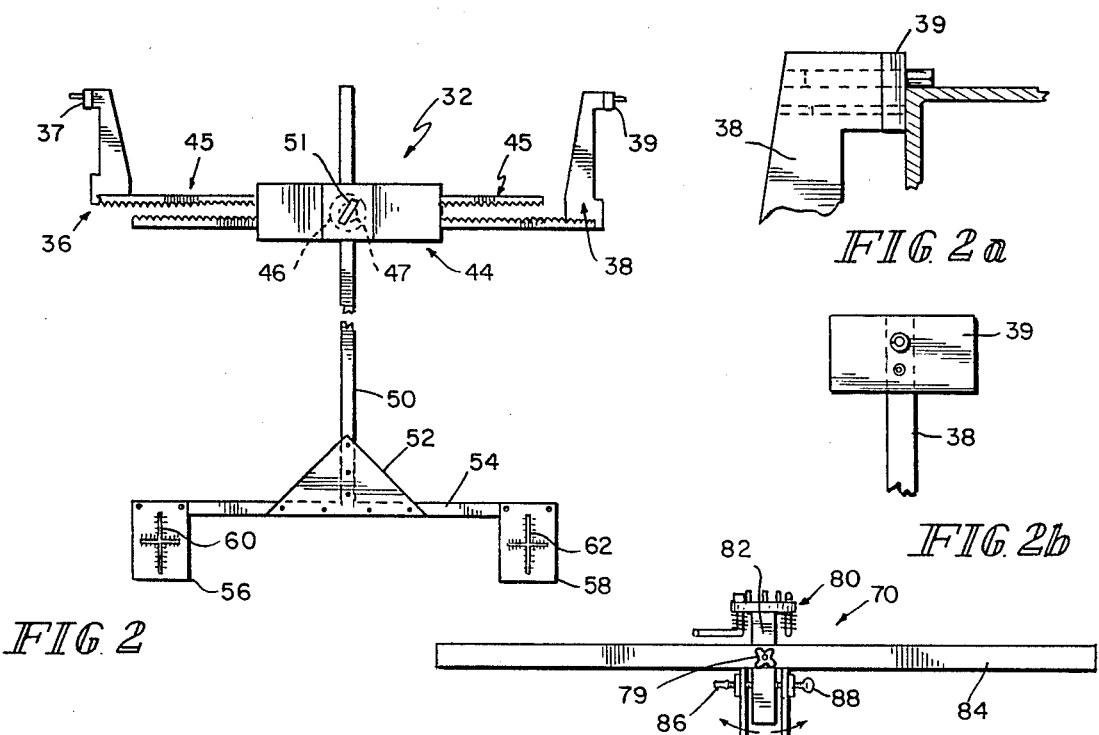
FIG. 2
FIG. 2a
FIG. 2b
FIG. 3

PORTABLE AXLE AND FRAME ALIGNMENT TOOL

This is a continuation of application Ser. No. 121,853, filed Nov. 17, 1987 and now abandoned.

BACKGROUND AND SUMMARY OF THE INVENTION

The present invention relates to a portable apparatus for aligning the axles of a vehicle, such as a tractor or trailer, and for detecting bends, bows, twists and other irregularities in vehicle frames and other components. The invention allows mechanics to repair and replace frames and other major structural components of vehicles in the field, without the aid of special purpose, precision-leveled racks and platforms.

In a tractor-trailer combination, the trailer will sometimes fail to properly trail the tractor because of axle misalignment. This problem generally results from the axle being misaligned such that it is not perpendicular to a fore-and-aft centerline of the frame of the trailer. Similar misalignments of the rear axle(s) of the tractor can also cause problems, such as accelerated tire wear, lowered fuel economy, and increased driver fatigue.

Various methods for providing vehicle axle correction have been proposed. U.S. Pat. No. 3,566,476 to McWhorter uses a light projector attached on a support behind the wheel axle. The projector is first directed towards a rear reference point extending from the underside of the trailer frame. The projector is then tilted downwardly and the beam projected forwardly to a front reference point attached to a kingpin. The beam will supposedly miss the kingpin reference point when the axle is out of alignment. Both the kingpin reference point and the rear reference point are located on the centerline of the trailer frame. The light projector is connected on a frame to two wheel gauges which are attached around the circumference of the tire. This arrangement suffers from being sensitive to tire size and wear, the regularity of the underlying ground surface, and other factors so that an inaccurate measurement of the misalignment of the axle may result. Also, since the projector is fixed along the centerline, the most accurate measurement of misalignment may not be possible since the deviation from true alignment is greatest on the adjusting side (as opposed to the stationary side) of the vehicle axle, and the deviation will therefore be greater on the adjusting side of the centerline than at the centerline. Thus, a measurement of misalignment made on the adjusting side of the axle will allow for increased resolution, when compared to a measurement made on the centerline or on the stationary side of the axle.

Another problem that has been noticed in devices such as that shown in U.S. Pat. No. 3,566,476 to McWhorter (i.e., devices which use a light projector attached on a support), is the relative ease with which the beam of light can deviate from a perpendicular relationship to the support and consequently the wheel axle. A minute deviation from the perpendicular arrangement of the light to the axis of the support, such as might result from normal tolerances in the support structure or light source enclosure, or by external forces acting on the support or light source enclosure, may cause a relatively large deviation and error at the target connected to the far end of the frame. Since the range of misalignment of an axle is normally measured in fractions of an inch, a slight deviation of the light beam from perpendicularity with the support (and wheel axle) will cause an erroneous measurement of axle alignment.

In addition to the alignment of vehicle axles, mechanics who maintain and repair large vehicles, such as tractors and trailers, are often called upon to replace components of the undercarriage, straighten or rebuilt frames, and otherwise repair damage caused by road collisions, extended usage, or material failures. To properly perform such repairs often requires the use of precision leveled working surfaces or other special tools and conditions to ensure that the rebuilt or repaired vehicle is serviceable. The present invention provides an arrangement for making such repairs which is convenient and relatively inexpensive, while maintaining the required degree of precision.

An object of the present invention is to provide an apparatus for aligning wheel axles of and making other repairs to a vehicle, which apparatus is both accurate and simple to operate.

Another object of the present invention is to provide an apparatus for aligning wheel axles of and making other repairs to a vehicle, which can be used on uneven ground.

Yet another object of the present invention is to provide such a device which is portable and which can be used in various surroundings and under various conditions.

A further object of the present invention is to provide a device which measures directly from the central axis of the wheel axle so that irregularities in the ground surface do not effect the measurement of wheel axle alignment.

A further object of the present invention is to provide a device for establishing a reference plane underneath the frame of a tractor or trailer so that measurements can be made between this reference plane and the vehicle, for providing an indication of irregularities in the frame of the vehicle.

A still further object of the present invention is to provide an apparatus for aligning the axles of a tractor which measures the alignment at different points along a line that is exactly parallel to the center axis of a wheel axle.

A still further object of the present invention is to provide a device which assures perpendicularity of a generated beam of light to a central axis of a support of the light source.

These and other objects of the present invention are achieved in a device for establishing a reference plane with respect to a vehicle frame from which measurements relating to the vehicle can be made and which includes a first target assembly attachable to the underside of the vehicle frame. This first target assembly has at least two targets spaced apart on a first line which is substantially transverse to the vehicle frame. The individual targets of the assembly are spaced an equal vertical distance from the underside of the frame. A second target assembly, which is attachable to the underside of the vehicle frame, also has at least two targets spaced apart on a second line which is substantially transverse to the vehicle frame. Each of these individual targets are also spaced the same vertical distance from the underside of the vehicle frame, and these targets are provided with openings for allowing a light beam to pass through. A light source directs a beam of light through an individual target of the second target assembly toward a corresponding target on the first assembly.

This light source is positionable along a line that is substantially transverse to the vehicle frame.

An advantage of this embodiment of the present invention is that a reference plane is established with respect to a vehicle frame by the multiple targets on the target assemblies. From this reference plane, measurements can be made to various points on the underside of the vehicle frame to detect irregularities, so that steps can be taken to correct these irregularities. A light source, which is positionable along a line substantially transverse to the vehicle frame, is used in combination with the multiple targets to define the reference plane beneath the vehicle so as to allow measurements to be made relative to the frame at any point.

Advantageous features are achieved by certain preferred embodiments of the present invention which include a U-shaped frame having a horizontal bar and two upright portions extending from the bar at right angles thereto. The upright portions include means for attaching the U-shaped frame to a central axis of the axle such that the horizontal bar is parallel to the central axis. A first target assembly is attachable to an underside of the vehicle, and has at least two targets spaced apart on a first line substantially transverse to the long axis of the vehicle and spaced an equal vertical distance from the underside of the vehicle. A second target assembly, which is also attachable to the underside of the vehicle, has at least two targets spaced apart on a second line substantially transverse to the long axis of the vehicle. The targets on the second target assembly are each spaced the same vertical distance from the vehicle underside, and are provided with openings for allowing a light beam to pass through the targets. Finally, a light source, for generating a beam of light, is slidably mounted on the horizontal bar of the U-shaped frame. This light source is slidably positionable to a plurality of points along the horizontal bar.

In the arrangements according to these preferred embodiments, very accurate alignment is provided since each of the target assemblies includes at least two targets so that the alignment can be measured at the adjusting side of the axle, as opposed to the center or stationary side of the axle. Since the axle effectively "pivots" about the stationary side, any deviation from perfect alignment at the adjusting side will be greater than at the center and still greater than at the stationary side, and thus, easier to detect and correct.

In some preferred embodiments, a perpendicularity checking device assures that the beam of light produced by the light source is perpendicular to the horizontally extending bar. This eliminates error which can be introduced into the measurements if the light beam produced by the source is not truly perpendicular to the horizontal bar of the frame which supports the light. Deviations from a truly perpendicular arrangement can result from normal tolerances in the light source support, especially in such supports which provide for horizontal and/or vertical movements of the light source. In order to allow for such movements, clearances must be provided in the mechanical parts of the support, and these clearances can result in variance of the light beam from a truly perpendicular orientation with respect to the horizontal bar of the frame. The light source itself may also be a source of error in this regard. The light source which is preferably used in this and other wheel alignment systems is a relatively low priced, low powered laser. The laser is mounted in a relatively lightweight frame which is subsequently attached (for example, by screws or bolts) to the underlying support frame. The inventor has determined that the light beam produced by the laser is not carefully aligned with the associated enclosure, including the brackets or holes provided for attachment to an underlying support, so that replacement of the laser assembly in such an aligning apparatus may introduce significant errors into measurements subsequently made by the apparatus.

In certain other preferred embodiments, objects of the invention are achieved in an apparatus which includes a U-shaped frame having a horizontal bar and two upright portions extending from the bar at right angles thereto. These upright portions include means for attaching the U-shaped frame to a central axis of the wheel axle so that the horizontal bar is parallel to the central axis. The apparatus also includes a frame squaring plate which is attachable to the frame of the vehicle. This squaring plate has at least two reference portions which, in one preferred embodiment, are upright bars. The distances from each of these reference portions to the horizontal bar is measured and compared to determine axle alignment. These preferred embodiments provide a portable apparatus which does not need a light source, yet which still provides an accurate measure of wheel axle alignment. Accurate measurement is assured through the use of a U-shaped frame which has a horizontal bar that is exactly parallel to the central axis of the axle being measured, and which is brought into relatively close proximity to the reference portions of the frame squaring plate.

Other objects, features, and advantages of the present invention will become more apparent from the following description when taken with the accompanying drawings which show, for purposes of illustration only, preferred embodiments in accordance with the present invention.

BRIEF DESCRIPTION OF THE DRAWINGS

FIG. 1 is a perspective view of a U-shaped frame constructed in accordance with a preferred embodiment of the present invention.

FIG. 2 is a front view of a rear target assembly constructed in accordance with a preferred embodiment of the present invention. FIGS. 2a and 2b show additional detail of the portion of the rear target assembly which is used to suspend the assembly from a vehicle frame.

FIG. 3 is a front view of a front target assembly constructed in accordance with a preferred embodiment of the present invention.

DETAILED DESCRIPTION OF THE DRAWINGS

Figure 4:
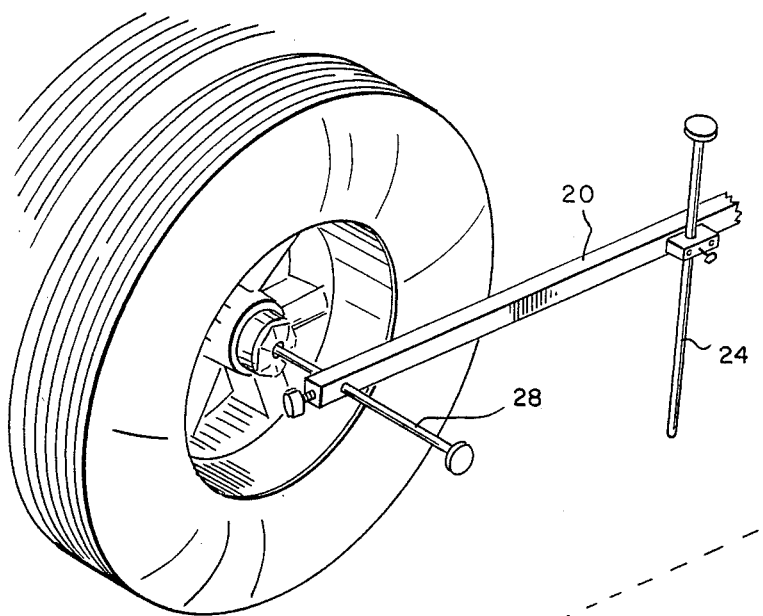
FIG. 4 is a perspective view showing a portion of the U-shaped frame of FIG. 1 connected to a vehicle wheel.

The major components of a preferred embodiment of the apparatus are shown separately in FIGS. 1–3, as attached and used to perform measurements on a vehicle in FIGS. 4–7.

The first major component of the apparatus is shown in FIG. 1 and is a U-shaped frame 10 upon which is mounted a light projector, such as a laser 12. Laser 12 is slidably mounted on frame 10, and is adjustable in the horizontal direction between stops 14 and 16. Stops 14 and 16 are spaced approximately five feet apart which allows laser 12 to define a reference plane which projects beyond the frame rails of most vehicles (frame rails are typically spaced on 32"–42" centers). A hinge 18 on which laser 12 is mounted allows laser 12 to be adjusted (tilted) in the vertical direction. Rigidly attached to horizontal bar 17 on which hinge 18 and laser 12 are mounted, are upright portions 20 and 22 which are rigidly fixed at right angles to horizontal bar 17. Adjustable support elements 24 and 26 are attached to upright portions 20 and 22 to provide vertical support when upright portions 20 and 22 are attached to a wheel axle (See FIGS. 4–6). Also attached to upright portions 20 and 22 are centering elements 28 and 30, whose structure and function is described in more detail below.

Rear target assembly 32 is shown in FIG. 2 and comprises the next major component of the apparatus. Upwardly extending arms 36 and 38 are horizontally adjustable by means of double rack assembly 44. Racks 45 are adjustable by means of a knob 46 (dashed lines) on the rear side of the assembly which is connected to gear 47 (dashed lines) positioned between racks 45. Blocks 37 and 39, which have a long axis extending into the paper in the FIG. 2 illustration, are provided to assure squareness of target assembly 32 to the vehicle frame. Blocks 37 and 39 are preferably attached to upright arms 36 and 38 by two rolled pins, one of which is allowed to project approximately ¼-¼ inch from the blocks to provide a support surface (i.e., the underside of the projecting pin) for suspending target assembly 32 from the vehicle frame (see FIG. 2(b)). Racks 45 are adjusted to press the vertical surfaces of blocks 37 and 39 tightly against a vertical surface of the vehicle frame, causing target assembly 32 to "self-adjust" to a perpendicular relationship with the longitudinal axis of the vehicle frame. A vertical bar 50 extends downwardly from rack assembly 44 and is vertically adjusted by knob 51. At the bottom of vertical bar 50 is a triangular plate 52. Attached to triangular plate 52, at a right angle to vertical bar 50, is horizontal bar 54. At the ends of horizontal bar 54 are targets 56 and 58 which have slots 60 and 62 therein.

The last major component of this preferred embodiment is a front plate target assembly 70 shown in FIG. 3. Target assembly 70 includes a vertical bar 72 extending downwardly from a first horizontal bar 84. Horizontal bar 84 is connected at a right angle to the top of vertical bar 72. A second horizontal bar 75 is connected at a right angle to the bottom of vertical bar 72 by triangle 74. Attached at both ends of second horizontal bar 75 are targets 76 and 78. Horizontal bar 75 is vertically adjustable to various positions and is held in that position by a clamping knob 79. A kingpin attachment device 80 for attaching front target assembly 70 to the kingpin of a trailer is attached to vertical member 82. Member 82 is pivotably connected to horizontal bar 84 and can be adjusted, relative to bar 84, by set screws 86 and 88 which are mounted to and extend through a portion of vertical bar 72. This arrangement allows horizontal bar 84, and consequently horizontal bar 75, to be adjusted so as to be parallel to the kingpin plate when target assembly 70 is suspended from the kingpin. It is also contemplated to provide means for attaching this target assembly to a part of the frame other than the kingpin, such as the frame rails or the kingpin plate, although attachment to the kingpin is preferred.

The arrangement for attaching and using target assemblies 32 and 70 and U-shaped frame 10 with a truck frame is shown in FIGS. 4–7. The U-shaped frame 10 is attached directly to the center of the wheel axle at its upright portions 20 and 22 by centering elements 28 and 30, as shown in FIG. 4. Centering elements 28 and 30 extend through upright portions 20 and 22 at right angles.

Centering elements 28 and 30 are at right angles to upright portions 20 and 22, and upright portions 20 and 22 are at right angles to horizontal bar 17. Thus, it is readily apparent that attachment of centering elements 28 and 30 to the center axis of the wheel axle will assure that horizontal bar 17 will be in a parallel relationship to the center axis of the wheel axle. Due to the rigidity of U-shaped frame 10, horizontal bar 17 will maintain this parallel relationship. It is important to note that centering elements 28 and 30 are attached directly to the center axis of the wheel axle. This is best accomplished by locating the conically-shaped depressions in the ends of the axle which are used to center the axle in a lathe during the axle manufacturing operation. The ends of centering elements 28 and 30 are conically-shaped and mate with the depressions in the axle ends to cause horizontal bar 17 to be precisely aligned and parallel with the exact center axis of the axle. This technique is believed to be much more accurate than other techniques such as that described in U.S. Pat. No. 3,566,476 to McWhorter which is discussed above.

Rear target assembly 32 is preferably attached to the frame rails of the vehicle. Racks 44 are extended so that the upwardly extending arms 36 and 38 will support target assembly 32. Blocks 37 and 39 are positioned to abut the frame rails so that targets 56 and 58 will be aligned along a line which is transverse to the trailer frame. Similarly, front target assembly 70 is attached to the kingpin plate by attachment device 80 and its dual targets 76 and 78 are also aligned along a line transverse to the trailer frame. This alignment may be accomplished by measuring and comparing the distances from each end of horizontal bar 84 to the front end of the kingpin plate or trailer frame.

The horizontal distances between targets 56 and 58 and between targets 76 and 78 are exactly equal. The vertical distances between each of the target pairs and the underside of the frame are also adjusted so that the respective targets lie in a plane which is parallel to the plane of the vehicle frame. In the illustrated embodiment, the back rail of the trailer box and the kingpin plate can be used as reference points for attaching the target assemblies since, during construction of the trailer frame, the kingpin plate and the back rail are placed in a jig and squared to each other, followed by construction of the rest of the trailer frame around these elements. In this way, a constant and desired spatial orientation between the kingpin plate and the back rail is assured, and thus, the alignment of the targets along lines transverse to the trailer frame and the presence of the four targets in a common plane are also assured.

Figure 5:
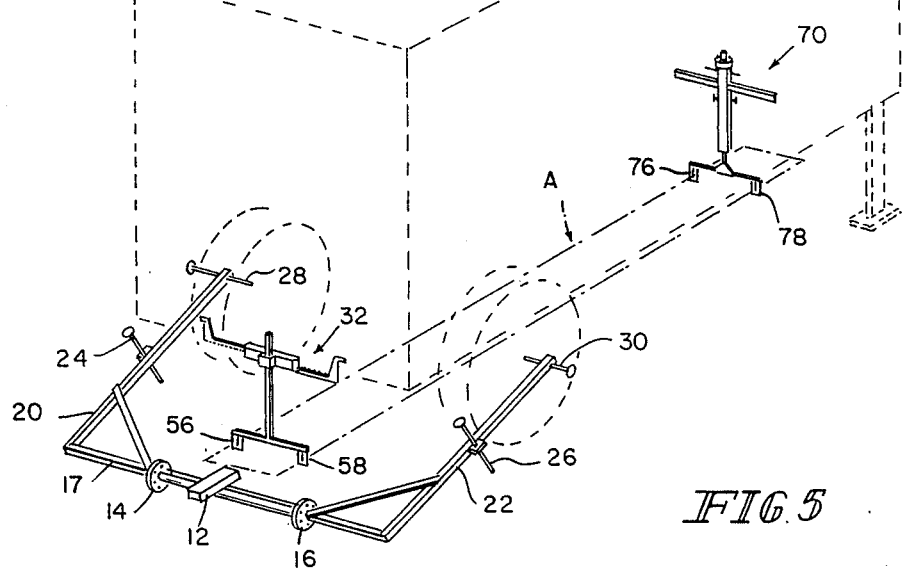
FIG. 5 is a schematic, perspective view of the arrangement of the apparatus of FIGS. 1-3 attached to a trailer frame.

FIG. 5 shows the establishment of a reference plane A by the use of the apparatus of the present invention. Laser 12 moves between stops 14 and 16 to a first position such that the light beam will project through target 56 of rear target assembly 32 onto target 76 of front target assembly 70. Laser 12 is then moved along horizontal bar 17 so that the light beam will project through target 58 onto target 78 of front target assembly 70. Since all four targets are positioned in the same plane, which is preferably parallel to the plane defined by the kingpin plate, reference plane A will also be parallel to the kingpin plate. Adjustable support elements 24 and 26 can be used to correct any angular inclination of horizontal bar 17 which might cause angling of the plane defined by laser 12 as it moves along horizontal bar 17.

Figure 6:
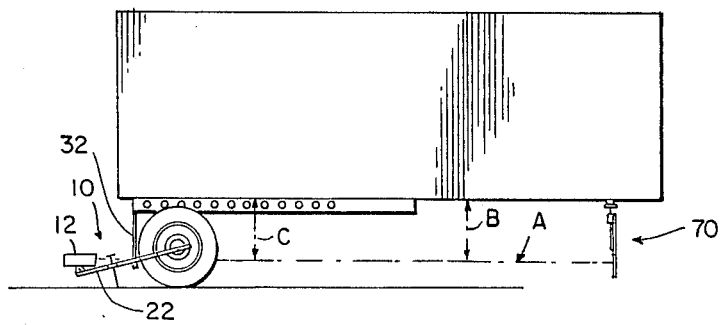
FIG. 6 is a side view of a trailer with a reference plane established underneath.

FIG. 6 illustrates the means for checking the truck frame for irregularities with the use of established reference plane A. After reference plane A has been established, a simple gauge is held against the bottom of the frame so that the light projected from laser 12 will impinge upon it, and the point of impingement on the gauge is noted. This is illustrated, by way of example, at point B in FIG. 6. The gauge is then moved to point C and the measurement is repeated. If the truck frame has been bowed, light from laser 12 will impinge upon a different location on the gauge, and the extent and degree of the irregularity (i.e., the bow) can be noted. Similar measurements relative to the reference plane will detect the degree of arch in the trailer floor and the degree of bend, twist or other irregularities in the frame elements of the vehicle. Measurements from the reference plane can also be used to locate and replace undercarriage components with precision and accuracy.

Figure 7:
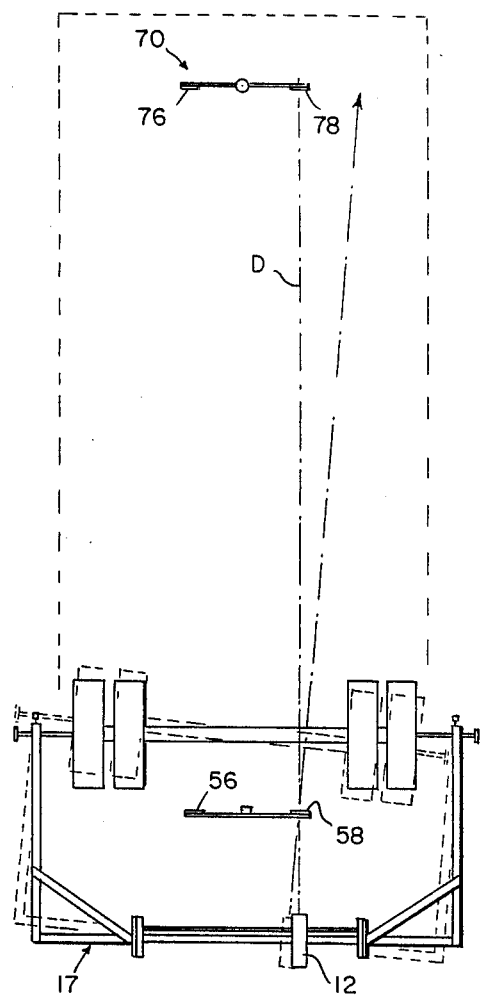
FIG. 7 illustrates a manner of using the apparatus of the present invention.

The use of this preferred embodiment of the apparatus to align a wheel axle is described with respect to FIG. 7. A correctly aligned axle, with the U-shaped frame of the present invention attached, is shown in solid lines, while an exaggeratedly misaligned axle, with U-shaped frame attached, is shown in dashed lines. When the axle is aligned properly, laser 12 will project through targets 56 and 58 to impinge upon targets 76 and 78, respectively. However, when the wheel axle is misaligned, horizontal bar 17 will be at exactly the same angle to the central longitudinal axis of the trailer frame as is the wheel axle. As can be seen from FIG. 7, light projected through either or both of targets 56 and 58 along projection line D may miss targets 76 and 78 altogether if the degree of misalignment is great. The degree of axle misalignment will in reality be less than is illustrated, so that rather than missing the entire targets 76 or 78, light beam D will miss a centering mark on target 78 which will indicate the presence and degree of misalignment.

The rear axles on a trailer unit are typically mounted in a frame arrangement to form a unit which is referred to as the slider. This unit rides on rails underneath the rear of the trailer box, and can be positioned in several for and aft positions depending upon the weight and distribution of cargo in the trailer box. One end of the axle arrangement is typically mounted in a relatively rigid and fixed manner to one side of the slider, although a certain amount of pivotable movement around the fixed mount is contemplated. The other side of the axle is mounted to the slider by means of an adjusting mechanism, such as a turn buckle, to allow that side of the axle to be moved in the for and aft direction. This allows a means for adjusting the transversely oriented axle axis relative to the longitudinal axis of the trailer.

As previously described, U-shaped frame 10 is mounted directly to the centers of the respective ends of the wheel axle. Horizontal bar 17 is thus parallel to the wheel axle. By adjusting the alignment of the wheel axle, horizontal bar 17 will also become parallel to the targets 56, 58 and 76, 78 so that when light beam D is projected through targets 56 and 58 onto targets 76 and 78, light beam D will impinge upon the centering mark on both targets 76 and 78, thereby indicating proper alignment of the axle.

Figure 10:
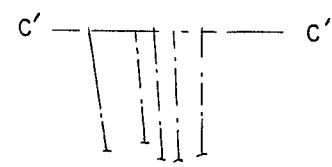
FIG. 10 is a top view of a perpendicularity checking device constructed in accordance with a preferred embodiment of the present invention, mounted on the frame of FIG. 1.
Figure 10:
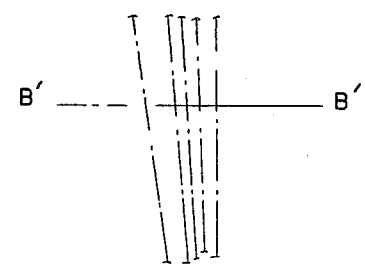
Figure 10:
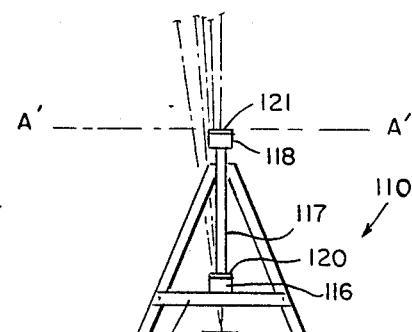
Figure 11:
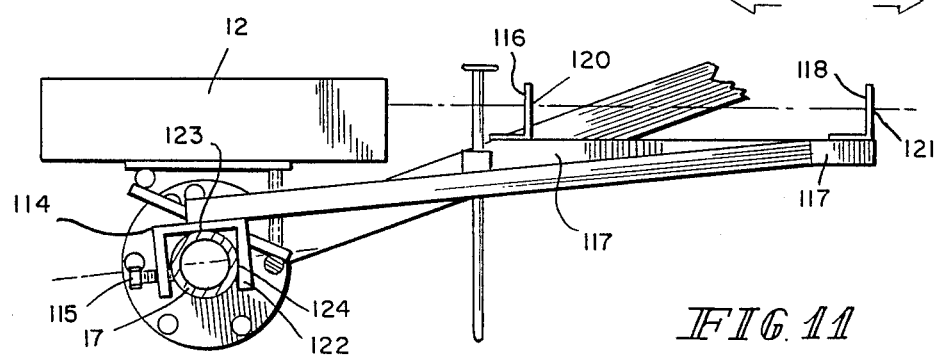
FIG. 11 is a side view of the apparatus shown in FIG. 10.

In certain preferred embodiments, U-shaped frame 10 includes a perpendicularity checking attachment 110, which is illustrated in FIGS. 10 and 11. Attachment 110 has an A-shaped frame with side legs 112 and a cross piece 113. Side legs 112 are each connected at one end to an attachment device 114 which mounts on horizontal bar 17. Attachment devices 114 include clamping screws 115 for clamping attachment 110 into position on horizontal bar 117. A first target 116 is positioned in the center of cross piece 113 and is provided with a small opening 120 for allowing the light beam to pass through. A rigid connecting piece 117 is connected to target 116. A second target 118 is attached to the other end of connecting piece 117. Second target 118 also has an opening 121 for allowing the light beam to pass therethrough. Openings 120 and 121 of targets 116 and 118 are aligned along a straight line which is perpendicularly aligned with an imaginary line passing through the centers of attachment devices 114.

In operation, attachment devices 114 are clamped in place on horizontal bar 17 by screws 115. Attachment devices 114 are U-shaped brackets which are designed to fit on horizontal bar 17 and wedged into position by the clamping action of screws 115.

As shown in FIG. 11, the profile of each device 114 is not symmetrical. Rather, the depending portion 115 of the U-shaped brackets which "faces" targets 116 and 118 is wedge-shaped so that when set screw 115 is tightened, attachment device 114 is pulled downwardly on horizontal bar 17 until contact is established at points 123 and 124. This design assures that attachment 110 can be repositioned, relative to horizontal bar 17, in the exact same position time after time, and that a zero tolerance fit between attachment 110 and horizontal bar 17 will be achieved time after time.

Following positioning of attachment 110 on horizontal bar 17, the light source is positioned to shine through first target 116. Since openings 120 and 121 of first and second targets 116 and 118 are aligned along a line which is perpendicular to the central axis of horizontal bar 17, the generated beam of light will pass through both first target 116 and second assurance target 118 only when the beam of light is itself perpendicular to the central axis of horizontal bar 17. If the beam does not pass through the openings in both targets, the orientation of the light relative to horizontal bar 17 is adjusted in order to bring the light beam into a near perfect perpendicular orientation with respect to horizontal bar 17. Once perpendicularity of the beam of light is assured, the operation of axle alignment or detection of frame irregularities is the same as that previously described.

The importance of checking and adjusting, if necessary, the alignment of the light beam produced by laser 12 is illustrated graphically in FIG. 10. Line A'A' marks a position which is co-aligned with the end of attachment 110 and which is approximately 15 inches from the source of the light beam (i.e., laser 12). Line B'B' represents a line that is 28 feet from the laser and corresponds to a typical distance that may be encountered in using the light on a tractor or small trailer. Line C'C' represents a line that is 45 feet from laser 12 and represents a distance at which measurements might be taken when using the apparatus on a full size trailer. If the light beam deviates from the true perpendicular line, relative to horizontal bar 17, by 0.010 inch at 15 inches (line A'A'), then the beam will deviate by 0.224 inch at 28 feet (line B'B') and by 0.360 inch at 45 feet (line C'C'). If the beam deviates from the perpendicular by 0.020 inch at line A'A', then the deviation at line B'B' will be 0.448 inch, and at line C'C' will be 0.720 inch. If the beam is off by 0.030 inch at line A'A', the resulting error at line B'B' will be 0.672 inch, and at line C'C' will be 1.080 inch. Finally, if the light beam is off by 0.060 inch at line A'A', the error at line B'B' will be 1.260 inches, and at line C'C' will be 2.025 inches. Thus, it can be seen that true alignment of the light beam relative to horizontal 17 is very important to assure that relatively large errors are not introduced into the alignment or measurement process.

In the apparatus of the present invention, when laser 12 is repositioned along horizontal bar 17, the tolerances required to provide for a sliding fit between the support for laser 12 and horizontal bar 17 can result in the introduction of errors such as those described above into the measurement and alignment process. Accordingly, a perpendicularity checking. arrangement, in the form of attachment 110, is provided to assure that such errors are not introduced when the light is repositioned. After repositioning of laser 12, and prior to taking measurements or attempting to align the axle, attachment 110 is mounted on horizontal bar 17 and the perpendicularity of the light beam is checked. If necessary, laser 12, which is mounted to the underlying support by screws or bolts fitted in slotted or slightly oversized holes, is adjusted to bring the light beam into perpendicular alignment with horizontal bar 17 by loosening the screws or bolts and repositioning the laser housing on the support. The perpendicularity of the beam must also be checked and adjusted, if necessary, when a new laser unit is fitted on the apparatus. This initial check and alignment is important regardless of whether the alignment system provides for a repositionable or sliding light, such as that in the preferred embodiment of the present invention, or a relatively stationary light, such as that shown in the McWhorter patent. It should be noted that the housing and mounting brackets associated with lasers or other light sources which are typically used in these applications are relatively light in weight and are non-rigid, and errors in alignment of the beam relative to the housing can be introduced by excessive wear and tear, handling, or other stresses and strains resulting from normal or abnormal usage. The present inventor has recognized that some arrangement for checking and adjusting the perpendicularity of the light beam produced by such lasers or other light sources, relative to the frame of an alignment or measuring device, should be provided to assure a greater degree of accuracy than might otherwise be provided.

Figure 8:
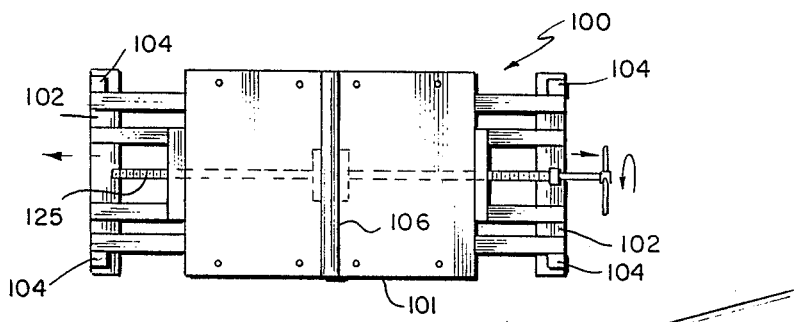
FIG. 8 is a top view of a squaring frame constructed in accordance with a preferred embodiment of the present invention.
Figure 9:
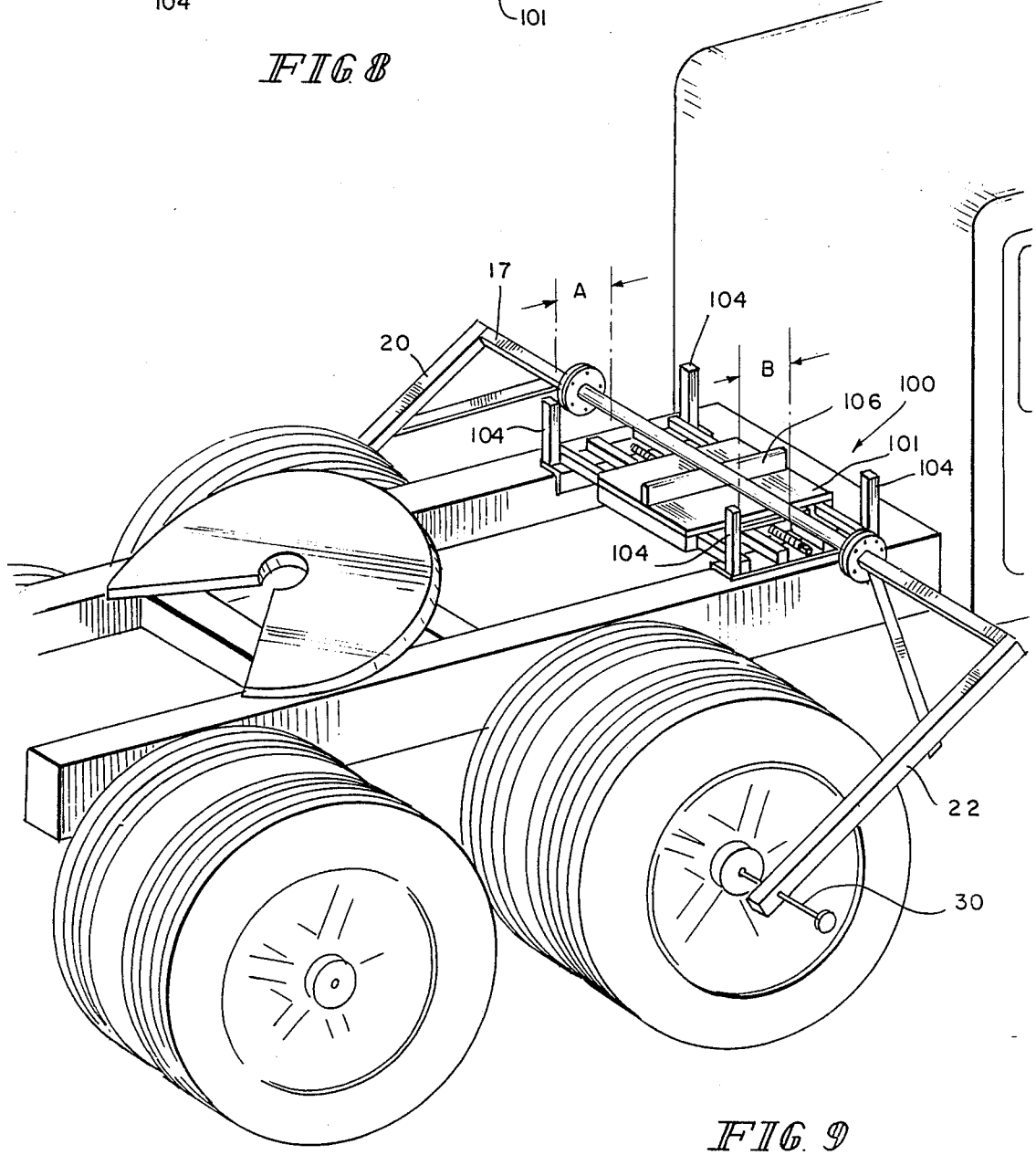
FIG. 9 shows the squaring frame of FIG. 8 being used with the frame of FIG. 1 to check the alignment of a vehicle axle without a light source.

An alternate preferred embodiment is shown in FIGS. 8 and 9 in which a light source is not needed for aligning the wheel axle. The same U-shaped frame 10 of FIG. 1 is used, but without laser 12. Also used is squaring frame 100 which is attached to the frame of, for example, a tractor and includes a top plate 101 with end elements 102 which are extendable, by means of threaded element 125, from plate 101 to attach squaring frame 100 to the tractor frame end elements 102 tightly about the edges of the frame elements to assure that squaring frame 100 is, in fact, square with respect to the tractor frame. Upright reference posts 104 extend upwardly from end elements 102. An upright support 106 extends upwardly from top plate 101.

Operation of this embodiment is illustrated in FIG. 9. Centering elements 28 and 30 of U-shaped frame 10 are attached to the wheel axle as in the previously described embodiments. Horizontal bar 17 is positioned above the tractor frame and lowered onto the upright support element 106 between upright reference posts 104. Because of the parallel relationship existing between horizontal bar 17 and the central axis of the axle, a measurement of the distances between upright reference posts 104 and horizontal bar 17 on both right and left sides of squaring frame 100 will give an indication of the alignment of the axle. Note that two measurements should be taken, the measurement from an upright post 104 on the right side of the tractor to horizontal bar 17 (distance A), and a measurement from an upright post 104 on the left side of the tractor to horizontal bar 17 (distance B). When these measurements are equal, horizontal bar 17 (and, thus, the central axis of the axle) will be perpendicular to the center line of the tractor frame and therefore will be properly aligned. The adjustment of the axle to bring the axle into alignment can be accomplished in a conventional manner, such as by inserted shims or by a turnbuckle.

Although the present invention has been described and illustrated in detail, it is to be clearly understood that the same is by way of illustration and example only, and is not to be taken by way of limitation. The spirit and scope of the present invention are to be limited only by the terms of the intended claims.

What is claimed is:

1. An apparatus for detecting defects in the alignment of an axle with a frame of a vehicle, and for detecting deformities in said frame, said apparatus comprising:

a first target assembly attachable to an underside of said vehicle, said first target assembly comprising a first generally vertical member having first and second ends, means for attaching the first end of the vertical member to the underside of the vehicle, a first generally horizontal member attached to the second end of the first vertical member, and at least two targets mounted on said first horizontal member and spaced apart on a first line substantially transverse to a longitudinal axis of the vehicle, and spaced an equal vertical distance from said underside;

a second target assembly attached to said underside, said second target comprising a second generally vertical member having first and second ends, means for attaching the first end of the vertical member to the underside of the vehicle, a second generally horizontal member attached to the second end of the second vertical member, and at least two targets spaced apart on a second line substantially transverse to said longitudinal axis of the vehicle, and each spaced said vertical distance from said underside, said second target assembly targets each having an opening;

a light source means for generating a beam of light and for projecting said beam through the opening in one of the second target assembly targets when the light source means is in a first position, and wherein said light source means is movably positionable along a third line substantially transverse to said longitudinal axis of the vehicle to a second position such that said generated beam of light in its two positions defines a reference plane as said light source means is moved from said first to said second position to project the light beam through the openings in the second target assembly targets; and gauge means, positionable between the underside of the vehicle and the reference plane, for indicating the existence of and degree of vertical deformation of the underside of the vehicle.

2. An apparatus according to claim 1, wherein said targets of said first and second target assemblies are symmetrically mounted on said first and second horizontal members, respectively, relative to a central longitudinal axis of said vehicle.

3. An apparatus according to claim 1, wherein said means for attaching said first end of the vertical member of said first target assembly to said vehicle includes means for attaching said first target assembly to a kingpin of said vehicle.

4. An apparatus according to claim 1, wherein said first and second target assemblies include vertical adjustment means for adjusting said vertical distance of said targets from said underside of said vehicle.

5. An apparatus according to claim 1, further comprising a U-shaped frame having a generally horizontally extending portion aligned along said third line substantially transverse to said vehicle longitudinal axis and having generally upright portions extending at right angles to said generally horizontally extending portion, and means for slidably supporting said light source means on said generally horizontally extending portion.

6. An apparatus according to claim 5, wherein said upright portions include axle connection means for connecting said U-shaped frame to an axle of said vehicle such that said generally horizontally extending portion of said U-shaped frame is parallel to said axle.

7. An apparatus according to claim 5, further comprising means for checking and adjusting the orientation of said projected beam of light to assure perpendicularity of said beam relative to the third line.

8. An apparatus according to claim 7, wherein said means for checking and adjusting the orientation of said projected beam of light is attached to said horizontal portion of the U-shaped frame.

9. An apparatus according to claim 7, wherein said means for checking and adjusting the orientation of said projected beam of light includes at least two targets spaced apart from one another along a line perpendicular to said generally horizontal portion, said targets having openings aligned along said perpendicular line for allowing said beam of light to pass therethrough.

10. An apparatus according to claim 7, wherein said means for checking and adjusting the orientation of said projected beam of light includes mounting means for attachment to the horizontal portion of the U-shaped frame, and wherein said mounting means assures that said checking means is repositionable on said horizontal portion of the U-shaped frame in substantially identical orientations.

11. An apparatus for detecting defects in the alignment of an axle with a frame of a vehicle, and for detecting deformities in said frame, the apparatus comprising:

a first target assembly attachable to an underside of said vehicle, said first target assembly comprising a first generally vertical member having first and second ends, means for attaching the first end of the vertical member to the underside of the vehicle, a first generally horizontal member attached to the second end of the first vertical member, and at least two targets mounted on said first horizontal member and spaced apart on a first line substantially transverse to a longitudinal axis of the vehicle, and spaced an equal vertical distance from said underside;

a second target assembly attached to said underside, said second target assembly comprising a second generally vertical member having first and second ends, means for attaching the first end of the vertical member to the underside of the vehicle, a second generally horizontal member attached to the second end of the second vertical member, and at least two targets spaced apart on a second line substantially transverse to said longitudinal axis of the vehicle, and each spaced said vertical distance from said underside, said second target assembly targets each having an opening;

a horizontal bar positioned beyond the second target assembly;

means for aligning the horizontal bar along an axis that is parallel to the axle of said vehicle;

a light source means for generating a beam of light, the light source means being slideably mounted on the horizontal bar and moveable between a first position where the light beam projects through one of the second targets toward a corresponding one of the first targets to a second position where the light beam projects through the other of the second targets toward a corresponding other of the first targets, the light source means thereby creating a reference plane underneath the vehicle; and gauge means, positionable between the underside of the vehicle and the reference plane, for indicating the existence of and degree of vertical deformation of the underside of the vehicle.

12. In an apparatus for detecting defects in the alignment of an axle with a frame of a vehicle, and for detecting deformities in the frame, said apparatus being of the type which comprises a light source movably mounted adjacent the vehicle for projecting a light beam underneath the vehicle, and at least one target assembly cooperating with the light beam projected by the light source, the improvement wherein said target assembly comprises a generally vertical member having first and second ends, means for attaching the first end of the vertical member to the underside of the vehicle, a generally horizontal member having a central portion attached to the second end of the vertical member, and at least two targets mounted to and spaced apart on said horizontal member.

13. An apparatus according to claim 1,2 wherein the first end of the vertical member is adjustable attached to the means for attaching said first end to the underside of the vehicle to allow the vertical distance from the targets to the underside of the vehicle to be adjusted.

14. An apparatus according to claim 12, wherein said means for attaching the first end of the vertical member to the underside of the vehicle comprises centering means for centering the vertical member along a central longitudinal axis of the vehicle.

15. An apparatus according to claim 12, wherein said target assembly further comprises a second horizontal member attached to the first end of the vertical member and extending adjacent a portion of the underside of the vehicle.

16. An apparatus of claim 15, wherein said vertical member and said horizontal members are rigidly attached to each other and pivotably attached to the means for attaching the first end of the vertical member to the underside of the vehicle, and further comprising means for pivotably adjusting the position of the vertical member and the horizontal members relative to the underside of the vehicle.

17. An apparatus according to claim 12, wherein said means for attaching the first end of the vertical member to the underside of the vehicle comprises means for self-adjusting the target assembly to a perpendicular relationship with a longitudinal axis of the vehicle.

* * * * *